US009723786B2

(12) United States Patent
Brummelhuis

(10) Patent No.: US 9,723,786 B2
(45) Date of Patent: Aug. 8, 2017

(54) COMBINE HEADER FOR STRIPPING SEEDS

(71) Applicant: Antonius J. M. Brummelhuis, Rainier (CA)

(72) Inventor: Antonius J. M. Brummelhuis, Rainier (CA)

( * ) Notice: Subject to any disclaimer, the term of this patent is extended or adjusted under 35 U.S.C. 154(b) by 106 days.

(21) Appl. No.: 14/926,655

(22) Filed: Oct. 29, 2015

(65) Prior Publication Data

US 2016/0120123 A1    May 5, 2016

(30) Foreign Application Priority Data

Nov. 3, 2014  (CA) ..................... 2869167

(51) Int. Cl.

| A01D 41/08 | (2006.01) |
| A01D 45/00 | (2006.01) |
| A01D 45/30 | (2006.01) |
| A01D 41/14 | (2006.01) |
| A01D 45/06 | (2006.01) |

(52) U.S. Cl.
CPC .......... *A01D 45/30* (2013.01); *A01D 41/147* (2013.01); *A01D 45/065* (2013.01)

(58) Field of Classification Search
CPC ...... A01D 45/30; A01D 45/00; A01D 41/147; A01D 75/02; A01D 45/003; A01D 34/40; A01D 46/02
USPC .................................................. 56/126, 130
See application file for complete search history.

(56) References Cited

U.S. PATENT DOCUMENTS

| 643,716 | A | * | 2/1900 | Green et al. ....... | A01D 34/8355 |
| | | | | | 56/100 |
| 1,186,832 | A | * | 6/1916 | Pridgen .................. | A01D 46/02 |
| | | | | | 56/127 |
| 1,368,014 | A | * | 2/1921 | Bauert .................... | A01D 47/00 |
| | | | | | 56/127 |
| 1,429,294 | A | * | 9/1922 | Newberry .............. | A01D 45/30 |
| | | | | | 56/207 |
| 1,590,259 | A | * | 6/1926 | Shelton .................. | A01D 45/30 |
| | | | | | 56/207 |
| 1,780,985 | A | * | 11/1930 | Shelton .................. | A01D 75/02 |
| | | | | | 209/327 |
| 1,786,487 | A | * | 12/1930 | George .................. | A01D 75/02 |
| | | | | | 56/207 |
| 2,867,961 | A | * | 1/1959 | Heilbrun ................ | A01D 65/00 |
| | | | | | 56/119 |

(Continued)

FOREIGN PATENT DOCUMENTS

CA        2869167 A1    5/2016

*Primary Examiner* — Árpád Fábián-Kovács
(74) *Attorney, Agent, or Firm* — Frost Brown Todd LLC

(57) ABSTRACT

A combine header comprising a header table with a knife extending along the front lower edge thereof. Seed pans are evenly spaced and extend forward from the front lower edge of the header table and slot is formed between them. At a middle portion of each slot a stripping plate slopes upward, outward, and rearward from a middle first point on a first one of the sidewalls forming the slot to an upper stripping edge of the stripping plate. The upper stripping edge is located above a top rear edge of a second one of the sidewalls forming the slot and aligned with same such that a vertically oriented stripping gap is formed between the upper stripping edge of the stripping plate and the top rear edge of the second one of the sidewalls. A rotating reel moves material from the seed pans rearward onto the header table.

20 Claims, 3 Drawing Sheets

(56) References Cited

U.S. PATENT DOCUMENTS

| | | | | |
|---|---|---|---|---|
| 3,521,435 | A | * | 7/1970 | Furuseth ................ A01D 45/30 |
| | | | | 56/128 |
| 3,812,661 | A | * | 5/1974 | Baker ................... A01D 41/147 |
| | | | | 56/128 |
| 4,255,920 | A | | 3/1981 | Janzen |
| 4,266,393 | A | * | 5/1981 | Taylor .................... A01F 11/00 |
| | | | | 460/107 |
| 5,557,912 | A | | 9/1996 | Voss et al. |
| 6,032,445 | A | | 3/2000 | Heintzman |
| 6,564,536 | B1 | * | 5/2003 | Hoffer ................... A01D 75/02 |
| | | | | 56/119 |
| 8,196,381 | B2 | * | 6/2012 | Herman ................. A01D 45/22 |
| | | | | 56/207 |
| 2012/0186215 | A1 | * | 7/2012 | Dietrich ............... A01D 41/147 |
| | | | | 56/126 |

\* cited by examiner

COMBINE HEADER FOR STRIPPING SEEDS

CROSS REFERENCE TO RELATED APPLICATIONS

This application claims priority to and benefit of Canadian Application Serial No. 2869167 filed Nov. 3, 2014, in its entirety for all purposes.

FIELD OF THE INVENTION

This disclosure relates to the field of agricultural harvesting equipment and in particular a combine header for harvesting seeds from standing crop plants such as hemp plants.

BACKGROUND

Combines for harvesting the seeds of standing agricultural crops commonly include a conventional header for cutting the portions of the crop plants that include the seeds and directing the cut portions into the threshing mechanism of the combine. These headers typically extend laterally and include a knife extending along the front edge of the table of the header to cut the plants, and a rotating reel that pushes the plats into the knife and then onto the table where an auger or belt conveys the cut plant portions into the threshing mechanism.

Stripper headers are also known where a rapidly rotating drum has closely spaced fingers which engage the plant stalks of wheat and like grains and strip the seed heads from the stalks without cutting the stalks and propel the seed heads onto the table. Such a stripper header is disclosed for example in U.S. Pat. No. 5,557,912 to Voss et al. These stripper headers thus convey only the seed bearing heads into the threshing mechanism, greatly reducing the volume of material passing through the threshing mechanism and increasing the capacity of the combine.

Other crops, such as sunflowers, are subject to significant losses with conventional headers. Sunflowers have a large seed head at the top of a tall stalk and at harvest time the stalks and heads are quite fragile such that many seeds and heads fall to the ground when contacted by the reel and are lost. Headers have been modified for harvesting sunflowers such as disclosed in U.S. Pat. No. 4,255,920 to Janzen and U.S. Pat. No. 6,032,445 to Heintzman which include seed pans that attach to the front edge of the header and extend forward of the knife. The pans are spaced to form slots between the pans. The crop plants pass along the slots and are cut by the knife at the rear end of the slots. Seeds falling from the plants are caught in the pans and work their way rearward and onto the knife. The top surfaces of the pans are flat, with raised side walls to keep the seeds on the pan. The pans are configured to slope somewhat downward from front to rear so that the seeds move down the sloping surface onto the header and into the harvester.

Hemp is a crop plant grown as an agricultural crop, with the seeds being used for food and a variety of industrial uses such as oil-based paints, in creams as a moisturizing agent, cooking, and in plastics. The long fibrous stems are also valuable for a further variety of industrial uses such as in paper, textiles, clothing, biodegradable plastics, construction, body products, and bio-fuel.

The hemp plant has a slender stem, ranging in height from 4 to 10 feet or more and a diameter from ¼" to ¾". Seeds are located along about the top third of the stalk and the stalk heights very considerably in the same field so that in order to harvest all the seeds the header must be operated low enough to cut off the top third of the shorter stalks.

Because it grows very tall compared other commonly grown agricultural crops, harvesting with conventional combines is often problematic. In tall varieties large quantities of plant material are put through the combine. Hemp straw contains very tough fibers that tend to wind around the moving parts and fine fibers work into bearings, causing friction that can lead to bearing breakdown and combustion. These factors cause heavy machinery wear, high maintenance costs and a great deal of time loss. Reducing the quantity of hemp stalk passing through the combine reduces contact between the moving parts and these fibers.

SUMMARY OF THE INVENTION

The present disclosure provides a combine header apparatus for harvesting the seeds of plants, in particular hemp plants, that overcomes problems in the prior art.

The present disclosure provides a combine header apparatus comprising a header table adapted for attachment to a combine, and a knife assembly comprising a knife extending along a front lower edge of the header table. A plurality of seed pans is attached to the header table extending forward from the front lower edge of the header table, and each seed pan has a pointed front end and right and left sidewalls extending upward from edges of a floor of the seed pan. The seed pans are substantially evenly spaced along a length of the header table, and a slot is formed between substantially parallel sidewalls of adjacent seed pans. At a middle portion of each slot a stripping plate slopes upward, outward, and rearward from a middle first point on a first one of the sidewalls forming the slot to an upper stripping edge of the stripping plate. The upper stripping edge is located above a top rear edge of a second one of the sidewalls forming the slot and substantially aligned with same such that a vertically oriented stripping gap is formed between the upper stripping edge of the stripping plate and the top rear edge of the second one of the sidewalls. A rotating reel is configured to move material from rear portions of the floor of each seed pan rearward onto the header table.

The disclosed header apparatus strips seeds off the plant stalks and catches same on seed pans then sweeps them off the seed pans and into the combine. The amount of plant stalks going through the combine is reduced.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
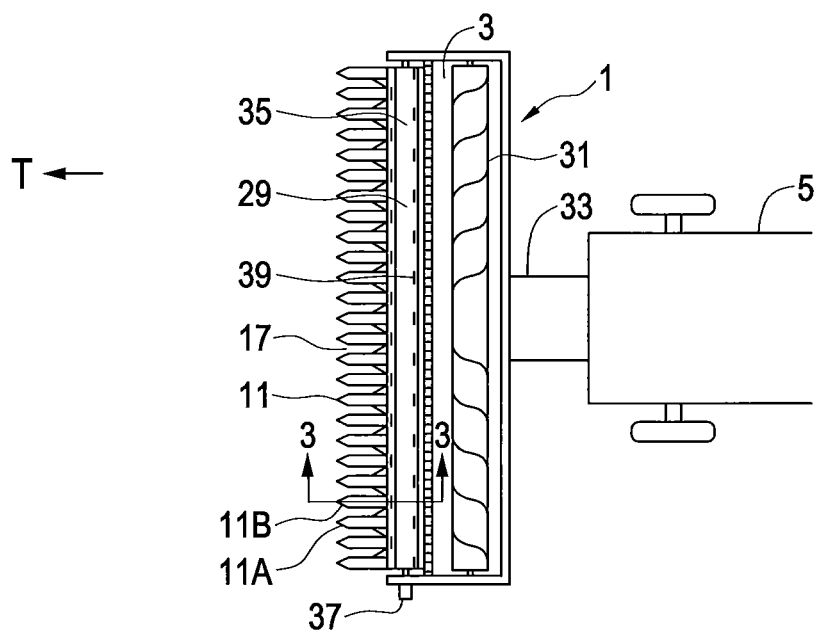
FIG. 1 is a schematic top view of an embodiment of the combine header apparatus of the present disclosure mounted on a combine.

FIGS. 1-4 schematically illustrate an embodiment of a combine header apparatus 1 of the present disclosure. The apparatus 1 comprises a header table 3 adapted for attachment to a combine 5 for operation in a forward operating travel direction T. A knife assembly, not visible in the top view of FIGS. 1 and 2 but shown in FIGS. 3 and 4, comprises a knife 7 extending along a front lower edge 9 of the header table 3.

A plurality of seed pans 11 is attached to the header table 3 and extend forward from the front lower edge 9 of the header table 3. Each seed pan 11 has a pointed front end and right and left sidewalls 13R, 13L extending upward from edges of a floor 15 of the seed pan 11. The seed pans 11 are substantially evenly spaced along a length of the header table 3, and a slot 17 is formed between substantially parallel sidewalls 13 of adjacent seed pans 11.

At a middle portion of each slot 17 a stripping plate 19 slopes upward, outward, and rearward from a middle first point 13MA of a first one of the sidewalls 13 forming the slot 17 to an upper stripping edge 21 of the stripping plate 19. The upper stripping edge 21 is located above a top rear edge 23 of a second one of the sidewalls 13 forming the slot 17 and aligned with same such that a vertically oriented stripping gap 25 is formed between the upper stripping edge 21 of the stripping plate 19 and the top rear edge 23 of the second one of the sidewalls 13.

Figure 4:
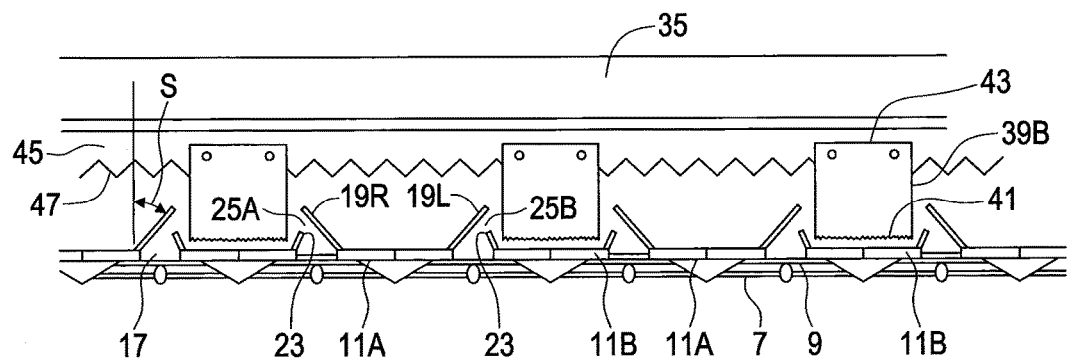
FIG. 4 is a schematic front view of the bottom portion of the reel and the seed pans of the embodiment of FIG. 1.

In the illustrated apparatus 1 as best seen in FIG. 4, the second one of the sidewalls forming the slot 17 slopes upward from a middle second point 13MB thereon to the top rear edge 23 thereof. The middle second point 13MB on the second one of the sidewalls forming the slot 17 is rearward of the middle first point 13MA on the first one of the sidewalls forming the slot. The stripping plate 19 slopes outward at an angle S that is between about 30 degrees and about 45 degrees down from vertical. As seen in FIG. 4 the second one of the sidewalls forming the slot 17 can also slope somewhat outward as well as upward from the middle second point 13MB to the top rear edge 23.

As the header apparatus 1 moves through a crop of standing plant stalks 20, the stalks move down the slots 17 and then along the tapered portion 27 of the stripping plates 19 which bends the stalk over laterally and down the stripping gap 25. As the header moves forward the stalk, still rooted to the ground, is also bent forward and the stalk drags down the stripping gap 25 between the upper stripping edge 21 of the stripping plate 19 and the top rear edge 23 of the sidewall 13 and the seeds carried on the stalk are stripped off and fall down onto the seed pan floor 15 that is under the stripping gap 25, or fall unto the sloping stripping plate 19 and slide down onto the floor 15 of the adjacent seed pan. As the bent over stalk finally reaches the knife 7 the top portion of the stalk is cut off and also fall to the floor 15 of one of the seed pans 11. A rotating reel 29, further described below, is configured to move material like the seeds and stalk portions from rear portions of the floor 15 of each seed pan 11 rearward onto the header table 3 where the table auger 31 carries the material to the feeder house 33 which in turn carries the material into the threshing mechanism of the combine 5. It can be seen from the schematic top view of FIG. 2 that seeds falling vertically in the area of the stripping gaps 25 will fall onto the floor 15 of one of the adjacent seed pans 11 since the slots 17 are entirely covered by the stripping plates 19.

In the illustrated apparatus 1, in order to provide a stripping gap 25 of the desired height, the rear portion of the sidewall 13 that forms the bottom of the stripping gap 25 must be high enough to allow the stripping plate 19 to be oriented at an angle S that is gentle enough to allow the stalks to keep moving down the slot 17 to the stripping gap 25 without binding and plugging the slot 17. It is contemplated that the stripping plate 19 could also slope outward from the rear portion of the floor of the seed pans 11 instead of beginning the slope at the top of the sidewalls 13.

The height H of the stripping gap 25 is selected to suit the particular crop being harvested. Where the apparatus 1 is adapted for harvesting hemp seed, the height H of each stripping gap is generally between about 0.75 inches and 2.00 inches, and more typically each stripping gap is between about 1.20 inches and 1.70 inches.

The width of the slot 17 where the header is adapted for harvesting hemp seed is generally between about 1.00 inches and 3.00 inches, and more typically the width of the slot is between about 1.50 inches and 2.50 inches.

Figure 2:
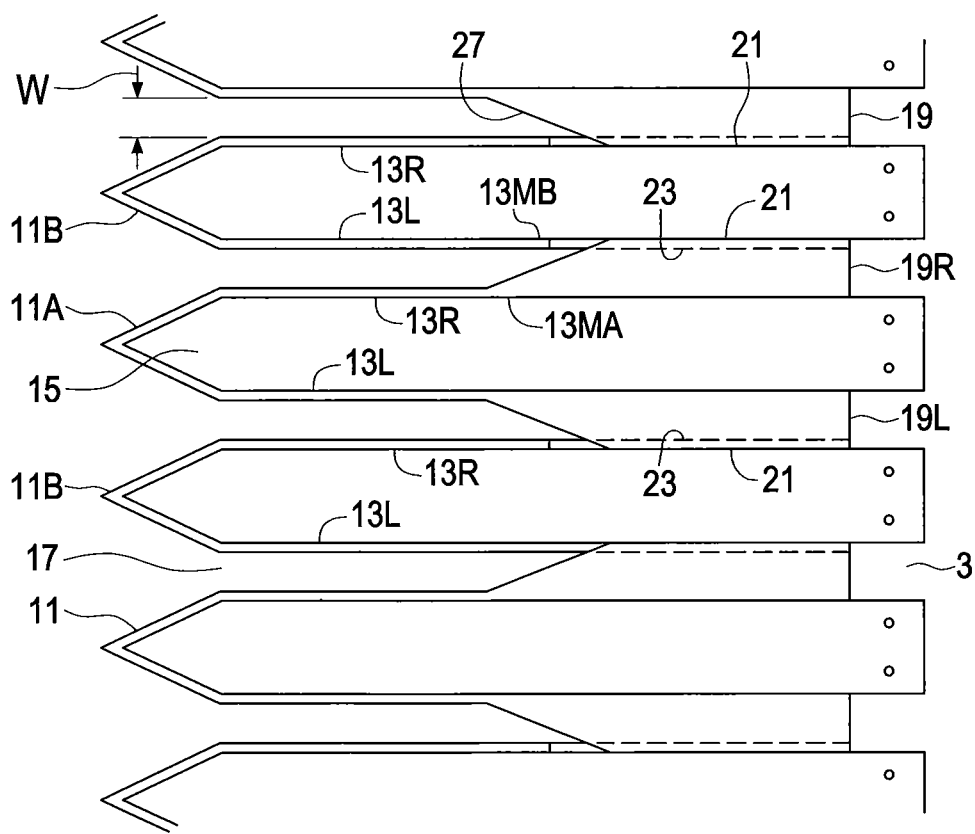
FIG. 2 is a schematic top view of the seed pans of the embodiment of FIG. 1.

The stripping plates 19 that essentially turn each of the horizontally oriented slots 17 into vertically oriented stripping gaps 25 can be provided by attaching first and second seed pans 11A, 11B alternately to the header table 3, as schematically illustrated in FIGS. 2 and 4. Right and left stripping plates 19R, 19L are attached to corresponding right and left sidewalls 13R, 13L of the first seed pans 11A such that corresponding right and left stripping gaps 25A, 25B are formed above top rear edges 23 of corresponding sidewalls 13 of adjacent second seed pans 11B on each side of the first seed pan 11A.

Figure 5:
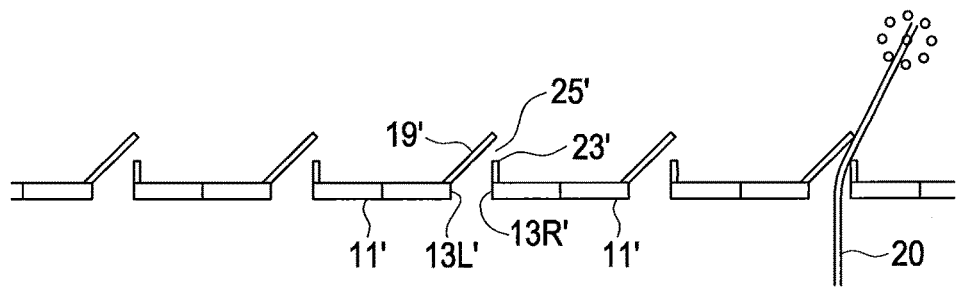
FIG. 5 is a schematic front view of an alternate seed pan configuration for use in the combine header apparatus of the present disclosure.

FIG. 5 schematically illustrates an alternate arrangement where all the seed pans are the same. Each seed pan 11' comprises a stripping plate 19' on a rear portion of its left sidewall 13L' such that a stripping gap 25' is formed above the top rear edge 23' of a right sidewall 13R' of an adjacent seed pan 11'. FIG. 5 also schematically illustrates a plant stalk 20 passing through the stripping gap 25'.

Figure 6:
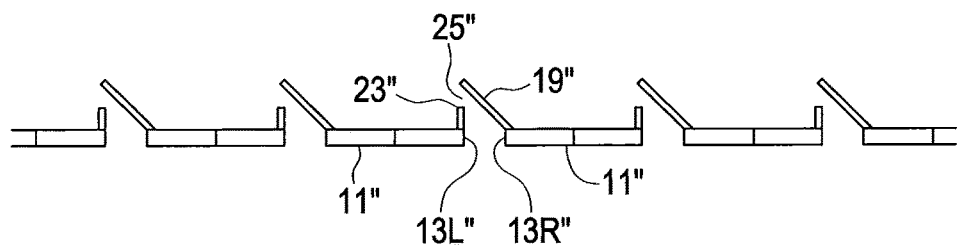
FIG. 6 is a schematic front view of a further alternate seed pan configuration for use in the combine header apparatus of the present disclosure.

FIG. 6 schematically illustrates a similar alternate arrangement where all the seed pans 11" are again the same except here each seed pan 11" comprises a stripping plate 19" on a rear portion of a right sidewall 13R" such that a stripping gap 25" is formed above the top rear edge 23" of a left sidewall 13L of an adjacent seed pan 11".

The arrangements of FIGS. 5 and 6 may simplify manufacture of the apparatus 1. Lateral forces exerted on each seed pan 11', 11" by the stalks bearing against the stripping plate 19', 19" on only one side of the seed pan may be problematic, but are likely balanced by the counterforce exerted against the opposite side by stalks pushed against same by the stripping plate of the adjacent stripping plate. In the arrangement above the lateral forces are substantially equal on each side of the seed pans 11A, 11B as they are configured the same on each side.

Figure 3:
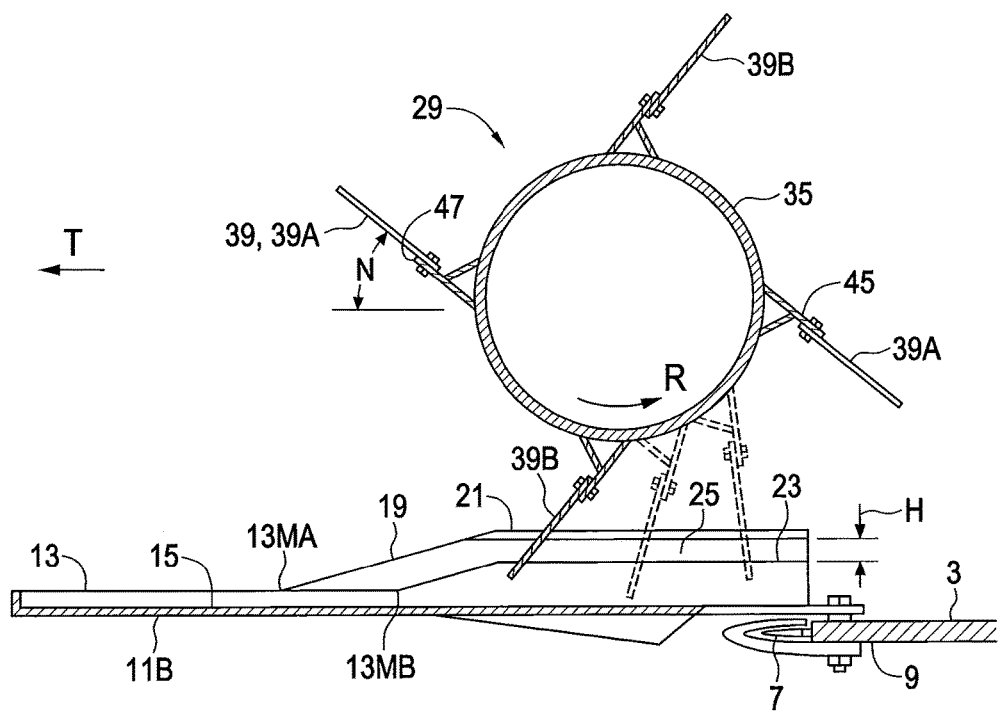
FIG. 3 is a schematic sectional view along line 3-3 in FIG. 1.

The illustrated reel 29 for moving the seeds and stalk portions from rear portions of the floor 15 of each seed pan 11 rearward onto the header table 3 comprises a drum 35 rotatably mounted at each end thereof to a corresponding end of the header table 3 such that the drum 35 is above the stripping gaps 25 as seen in FIG. 3, and a drive 37 operative to rotate the drum 35 such that a bottom side of the drum 35 moves in the rearward direction R. For each seed pan, push plates 39 extending from an outer surface of the drum 35 are configured to move, as the drum 35 rotates, rearward between the sidewalls 13 of the seed pan 11 and above the floor 15 thereof such that material on the floor 15 is contacted by the push plates 39 and moved rearward onto the header table 3. In the illustrated reel 29 the push plates 39 sweeping along the seed pans 11 are arranged alternately along the drum 35 so that as the drum 35 rotates first one seed pan 11 is swept then the next adjacent. As seen in FIG. 3, there are two push plates 39 mounted on the drum for each seed pan 11. The push plates 39A sweep the seed pans 11A and push plates 39B sweep the seed pans 11B. The outer ends 41 of the push plates 39 are somewhat serrated and pass just above the floor 15 of the seed pan 11 when the drum 35 rotates as shown by the phantom lines in FIG. 3.

Each push plate 39 slopes in a forward plate direction from an inner edge 43 thereof, attached to the drum 35, to the outer edge 41 thereof as the push plate 39 moves rearward in direction R between the sidewalls 13 of the seed pan 11. The push plates 39 slope rearward at an angle N of greater than 20 degrees from a line perpendicular to the outer surface of the drum 35. The forward slope of the push plates 39 allows material to drop off the outer ends 41 of the push plates 39 and onto the header table 3 instead of being carried around the drum 35.

Also in the illustrated reel 29 a plurality of ridge plates 45 extend from the outer surface of the drum 35 along the length of the drum 35 and slope in the forward plate direction the same as the push plates 39 Outer edges 47 of the ridge plates 45 are also serrated and pass above the upper stripping edges 21 of the stripping plates 19 as the drum 35 rotates. The serrated ridge plates 45 help move plant stalks rearward toward the knife 7 and header table 3.

Conveniently the push plates 39 are attached to the ridge plates 44, which are oriented at the same angle N, and extend beyond outer edges 47 of the ridge plates 45 so same extend farther down toward the floor 15 of the seed pans 11. In the illustrated apparatus 1, the forward most position of the outer edges 47 of the ridge plates 45 is generally above the tapered portion 27 of the stripping plates 19 that slopes upward, outward, and rearward from the middle portion 13M of the corresponding attached sidewall 13 to the upper stripping edge 21 of the stripping plate 19.

The disclosed header apparatus strips seeds off the plant stalks and catches same on seed pans then sweeps them off the seed pans and into the combine. The amount of plant stalks going through the combine is reduced. It is contemplated that conventional seed pans can be converted by the addition of sloping stripping plates, rear sidewall portions, etc. to economically provide the combine header apparatus of the present disclosure.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A combine header apparatus comprising:
   a header table adapted for attachment to a combine;
   a knife assembly comprising a knife extending along a front lower edge of the header table;
   a plurality of seed pans attached to the header table and extending forward from the front lower edge of the header table, each seed pan having a pointed front end and right and left sidewalls extending upward from edges of a floor of the seed pan;
   wherein the seed pans are substantially evenly spaced along a length of the header table, and a slot is formed between substantially parallel sidewalls of adjacent seed pans;
   wherein at a middle portion of each slot a stripping plate slopes upward, outward, and rearward from a middle first point on a first one of the sidewalls forming the slot to an upper stripping edge of the stripping plate;
   wherein the upper stripping edge is located above a top rear edge of a second one of the sidewalls forming the slot and substantially aligned with same such that a vertically oriented stripping gap is formed between the upper stripping edge of the stripping plate and the top rear edge of the second one of the sidewalls; and
   a rotating reel configured to move material from rear portions of the floor of each seed pan rearward onto the header table.

2. The apparatus of claim 1 wherein the second one of the sidewalls forming the slot slopes upward from a middle second point thereon to the top rear edge thereof.

3. The apparatus of claim 2 wherein the second one of the sidewalls forming the slot slopes outward from the middle second point thereon to the top rear edge thereof.

4. The apparatus of claim 2 wherein the middle second point on the second one of the sidewalls forming the slot is rearward of the middle first point on the first one of the sidewalls forming the slot.

5. The apparatus of claim 1 wherein the stripping plate slopes outward at an angle between about 30 degrees and about 45 degrees down from vertical.

6. The apparatus of claim 1 comprising first and second seed pans alternately attached to the header table and wherein right and left stripping plates are attached to corresponding right and left sidewalls of the first seed pans such that corresponding right and left stripping gaps are formed above top rear edges of corresponding sidewalls of adjacent second seed pans.

7. The apparatus of claim 1 wherein each seed pan comprises a stripping plate on a rear portion of a right sidewall such that a stripping gap is formed above the top rear edge of a left sidewall of an adjacent seed pan.

8. The apparatus of claim 1 wherein each seed pan comprises a stripping plate on a rear portion of a left sidewall such that a stripping gap is formed above the top rear edge of a right sidewall of an adjacent seed pan.

9. The apparatus of claim 1 adapted for harvesting hemp seed and wherein a height of each stripping gap is between about 0.75 inches and 2.00 inches.

10. The apparatus of claim 9 wherein the height of each stripping gap is between about 1.20 inches and 1.70 inches.

11. The apparatus of claim 1 adapted for harvesting hemp seed and wherein a width of the slot is between about 1.00 inches and 3.00 inches.

12. The apparatus of claim 11 wherein a width of the slot is between about 1.50 inches and 2.50 inches.

13. The apparatus of claim 1 wherein the reel comprises:
   a drum rotatably mounted at each end thereof to a corresponding end of the header table such that the drum is above the stripping gaps;
   a drive operative to rotate the drum such that a bottom side of the drum moves rearward;
   for each seed pan, at least one push plate extending from an outer surface of the drum and configured to move, as the drum rotates, rearward between the sidewalls of the seed pan and above the floor thereof such that material on the floor is contacted by the at least one push plate and moved rearward onto the header table.

14. The apparatus of claim 13 wherein each push plate slopes in a forward plate direction from an inner edge thereof, attached to the drum, to an outer edge thereof as the push plate moves rearward between the sidewalls of the seed pan.

15. The apparatus of claim 14 wherein the push plate slopes rearward at an angle of greater than 20 degrees.

16. The apparatus of claim 14 comprising for each seed pan, a plurality of push plates configured to move rearward between the sidewalls of the seed pan.

17. The apparatus of claim 16 comprising a plurality of ridge plates extending from the outer surface of the drum along the length of the drum and sloping in the forward plate direction, and wherein outer edges of the ridge plates are serrated and pass above the upper stripping edges of the stripping plates as the drum rotates.

18. The apparatus of claim 17 wherein the push plates are attached to the ridge plates and extend beyond outer edges of the ridge plates.

19. The apparatus of claim 18 wherein the outer edges of the push plates are serrated.

20. The apparatus of claim 17 wherein the forward most position of the outer edges of the ridge plates is above a tapered portion of the stripping plates, the tapered portion of each stripping plate being that portion that slopes upward, outward, and rearward from the middle portion of the corresponding attached sidewall to the upper stripping edge of the stripping plate.

* * * * *